United States Patent Office 2,951,845
Patented Sept. 6, 1960

2,951,845

PRODUCTION OF 4-(PYRIDINE CARBOXYLIC ACID AMIDO)-2,3-DIMETHYL-1-PHENYL-5-PYRAZOLONES

Ernst Kriege, Hamburg-Volsdorf, and Wilhelm Steinbrugger, Hamburg, Germany, assignors to Firma Peter Stoltenberg, Chemische Fabrik, Hamburg-Wandsbek, Germany No Drawing. Filed Feb. 5, 1958, Ser. No. 713,303

Claims priority, application Germany Feb. 8, 1957

5 Claims. (Cl. 260—295)

The present invention relates to the production of 4-(pyridine carboxylic acid amido)-2,3-dimethyl-1-phenyl-5-pyrazolones, and more particularly to the production of 4-(pyridine-3-carboxylic acid amido-or alkylamido)-2,3-dimethyl-1-phenyl-5-pyrazolones.

If it is attempted to produce a 4-(pyridine carboxylic acid amido)-2,3-dimethyl-1-phenyl-5-pyrazolone by the reaction of a pyridine carboxylic acid halogenide such as nicotinic acid halogenide with 4-amino-or 4-monoalkylamino - 1 - phenyl-2,3-dimethyl - pyrazolone utilizing normal reactants it will be found that this reaction must take place in the presence of a condensation and acid-binding agent such as pyridine, under cooling with ice and utilizing an aromatic hydrocarbon such as benzene or toluene as reaction medium. These are conditions which are undesirable from the point of view of satisfactory yield and facility of operation. In addition, the use of costly pyridine in this process and the expense of utilizing a cooling means during the reaction is also disadvantageous from the point of view of economy. Furthermore, this reaction gives rise to side reactions and to the production of a relatively impure final product which can be purified only by repeated recrystallizations.

It is therefore a primary object of the present invention to provide a method of producing 4-(pyridine carboxylic acid amido)-2,3-dimethyl-1-phenyl-5-pyrazolones which method can be carried out without the presence of an acid-binding agent and without the need for considerable cooling of the reaction medium.

It is a further object of the present invention to provide a method of producing 4-(pyridine carboxylic acid amido-or alkylamido) - 2,3 - dimethyl-1-phenyl-5-pyrazolones in high yield by the reaction of a pyridine carboxylic acid halogenide with a 4-amino-or 4-monoalkylamino - 1 - phenyl - 2,3 - dimethyl-pyrazolone without the need for ice cooling and without carrying out the reaction in the presence of an acid-binding agent such as pyridine.

It is still a further object of the present invention to provide a method of carrying out the above reaction whereby the finally produced product is directly obtained in quite pure form and can be converted to absolutely pure form by means of only a single crystallization.

Other objects and advantages of the present invention will be apparent from a further reading of the specification and of the appended claims.

With the above objects in view, the present invention mainly consists in a method of producing a 4-(pyridine carboxylic acid amido)-2,3-dimethyl-1-phenyl-5-pyrazolone which comprises reacting the reaction product of a metal salt of a pyridine carboxylic acid and a thionyl halide, this reaction product being free of hydrogen halide, with a substance selected from the group consisting of 4-amino-1-phenyl-2,3-dimethyl-pyrazolone and 4-monoalkylamino-1-phenyl-2,3-dimethyl - pyrazolones in the absence of an acid-binding agent so as to form the corresponding compound selected from the group consisting of 4-(pyridine carboxylic acid amido)-2,3-dimethyl-1-phenyl-5-pyrazolones and 4-(pyridine carboxylic acid alkylamido) - 2,3 - dimethyl-1-phenyl-5-pyrazolones, and recovering the thus formed compound.

In the case where the metal salt of a pyridine monocarboxylic acid is reacted with a thionyl halide such as thionyl chloride the resulting reaction product is a pyridine carboxylic acid halogenide which is practically free of hydrogen halide. This pyridine carboxylic acid halogenide, e.g. pyridine carboxylic acid chloride, can be directly reacted with a 4-amino or 4-alkylamino-1-phenyl-2,3-dimethyl-pyrazolone to form the desired reaction product.

In the case of reacting a metal salt of a pyridine dicarboxylic acid with thionyl chloride the resulting product is not the acid chloride but is rather an anhydride. This anhydride when reacted with a 4-amino-or 4-monoalkylamino-1-phenyl-2,3-dimethyl-pyrazolone forms the corresponding mono-compound. This will be illustrated in Example 3.

For purposes of convenience the rest of this specification will mainly be described in connection with pyridine mono-carboxylic acids, the reaction thereof with thionyl chloride to form the pyridine mono-carboxylic acid chloride, and the reaction of pyridine mono-carboxylic acid halogenides such as pyridine mono-carboxylic acid chloride with 4-amino or 4-alkylamino-1-phenyl-2,3-dimethyl-pyrazolones to form the compounds in accordance with the present invention.

Although the reaction in accordance with the present invention will mainly be described with reference to the reaction of a nicotinic acid halogenide, that is of a pyridine-3-carboxylic acid halogenide, with a 4-amino-or 4-monoalkylamino - 1 - phenyl-2,3-dimethyl-pyrazolone, it is to be understood that the reaction applies equally to the use of any other pyridine carboxylic acid halogenide such as a pyridine-4-carboxylic acid halogenide. For purposes of convenience, the reaction will mainly be discussed with respect to the reaction of nicotinic acid halogenides such as nicotinic acid chloride.

It has been discovered in accordance with the present invention that if the reaction is carried out utilizing a pyridine carboxylic acid halogenide which is free of hydrogen halogenides such as hydrogen chloride the reaction may be carried out in the presence of an aromatic hydrocarbon such as benzene or toluene without the need for the presence of an acid-binding agent such as pyridine and without the need for cooling by means of ice as the reaction proceeds. Not only can these expensive measures of the ordinary reaction be dispensed with by proceeding in accordance with the present invention but also there are further advantages with respect to improved yield and more pure final product.

It has further been found in accordance with the present invention that if a metal salt of a pyridine carboxylic acid, for example sodium nicotinate, is reacted with practically the equivalent amount of thionyl chloride, preferably utilizing a solvent or diluting agent such as benzene and preferably under warming, the product which is produced is a pyridine carboxylic acid chloride which is free of any hydrochloric acid, even any accumulated hydrochloric acid adhering to the compound. This hydrogen chloride-free pyridine carboxylic acid chloride can then be reacted directly with a 4-amino-or 4-monoalkylamino-1-phenyl - 2,3 - dimethyl - pyrazolone without the addition of an acid-binding agent and without cooling to produce a reaction mixture from which the final product, namely 4-(pyridine carboxylic acid amido-or alkylamido)-2,3-dimethyl-1-phenyl-5-pyrazolone can be obtained. The reaction is preferably carried out in the presence of an aromatic hydrocarbon such as benzene or toluene.

The reaction is accordance with the present invention results in the production of the hydrochloride of the final product. The hydrochloride of the final product is separated from the aromatic hydrocarbon solvent, it is dissolved in water and the final product is precipitated from the aqueous solution by means of a base such as sodium hydroxide. The final product is the substantially pure 4-(pyridine carboxylic acid amido-or alkylamido)-2,3-dimethyl-1-phenyl-5-pyrazolone.

In accordance with a preferred embodiment of the present invention the pyridine carboxylic acid halogenide which is free of any hydrogen halide such as hydrogen chloride is, as indicated above, produced by reacting a metal salt of a pyridine carboxylic acid with practically the equivalent amount of thionyl chloride, preferably in the presence of a solvent such as benzene. In accordance with this embodiment of the present invention the resulting reaction mixture is freed of any residue of sulfur dioxide and this reaction mixture without separation of the produced pyridine carboxylic acid chloride is then used directly for the production of 4-(pyridine carboxylic acid amido)-2,3-dimethyl-1-phenyl-5-pyrazolone. In this event the final reaction mixture of this reaction will contain in addition to the hydrochloride of the final compound, also the metal chloride which is produced by the reaction of the pyridine carboxylic acid metal salt with the thionyl chloride. This metal chloride is of course easily separated after the reaction from the solvent along with the hydrogen chloride of the final compound and the metal chloride is dissolved in water along with the hydrogen chloride of the final compound. The final compound is then obtained as the free compound by the reaction with the base such as sodium hydroxide so that the final compound is precipitated from the aqueous solution which will still contain the metal chloride.

The new process of the present invention according to which the acid chloride of a pyridine-mono-carboxylic acid or pyridine-di-carboxylic acid such as nicotinic acid, isonicotinic acid, quinolinic acid, or the like is reacted with a 4-amino- or 4-monoalkyamino-1-phenyl-2,3-dimethylpyrazolone has the advantage that the final product which is produced is already in such pure form that a single recrystallization is sufficient to obtain the chemically pure substance, which in the case of the 4-(pyridine-3'-carboxylic acid amido)-2,3-dimethyl-1-phenyl-5-pyrazolone has a melting point of 256–257° C. In addition, this method in comparison to the method which is carried out utilizing the normal starting material and carried out in the presence of pyridine and under cooling has the advantage of increased yields which is extremely important in view of the high prices of the starting materials. In the production of the pyridine carboxylic acid halogenides which are free of hydrogen halides such as hydrogen chloride in accordance with the present invention by the reaction of thionyl chloride with a salt of pyridine carboxylic acid the alkali metal salts of pyridine carboxylic acids are of course most preferred. In addition heavy metal salts such as copper salts may be utilized. By producing the pyridine carboxylic acid halogenides in this manner by the reaction with practically the equivalent amount of thionyl chloride the resulting acid chloride is produced along with the corresponding metal chloride. The sulfur dioxide which is also formed is in gaseous state and can easily be removed from the reaction mixture by cooking for a short period of time. In comparison to the usual methods of producing pyridine carboxylic acid chlorides, for example nicotinic acid chloride, by which dry nicotinic acid is introduced into thionyl chloride utilizing an excess of thionyl chloride and heated under refluxing with the thionyl chloride, the production of the pyridine carboxylic acid chloride in accordance with the present invention results in the production of the pure acid chloride and not in the chlorohydrate. This is of considerable importance because the chlorohydrate has bound thereto hydrochloric acid which requires considerable amounts of pyridine to bind the same if the pyridine carboxylic acid thus produced is utilized in the reaction.

As indicated above, the acid chloride is produced preferably utilizing a solvent or diluting agent such as benzene. After driving off the residue of sulfur dioxide the pyridine carboxylic acid chloride and the metal chloride, e.g. sodium chloride is suspended in the benzene or other solvent. This suspension can be directly utilized for reaction with 4-amino-1-phenyl-2,3 - dimethyl - pyrazolone without the addition of any pyridine. The reaction can in fact take place in the very same apparatus which was utilized for the production of the acid chloride. In accordance with the method of the present invention it is also not necessary to cool the acid chloride-solvent-reaction mixture. On the contrary, a higher starting temperature may be utilized for the process.

The condensation reaction is particularly satisfactorily carried out by introducing a hot saturated solution of 4-amino-1-phenyl - 2,3 - dimethyl - pyrazolone in benzene under rapid stirring into the pyridine carboxylic acid chloride suspension. This condensation proceeds without cooling since it has been found that utilizing a reaction temperature of about 60–70° C. the process proceeds advantageously to give high yield and high quality of the final product Upon the completion of this reaction the reaction mixture comprises as solid precipitated substance a mixture of the hydrochloride of the 4-(pyridine carboxylic acid amido- or alkylamido)-2,3-dimethyl-1-phenyl-5-pyrazolone and sodium chloride which can easily be separated from the solvent. The solid mixture is then treated in water in which the same dissolves. The solution is mixed with some decolorizing carbon and warmed slightly. It is then filtered, cooled and reacted with a base such as sodium hydroxide. The resulting precipitate is, for example, in the case of the reaction of nicotinic acid chloride the 4-(pyridine-3-carboxylic acid amido)-2,3-dimethyl-1-phenyl-5-pyrazolone in crude condition. The melting point is about 251–252° C.

The method of the present invention not only avoids the use of a binding agent such as pyridine to bind the hydrogen chloride which normally accompanies the pyridine carboxylic acid chloride and is freed therefrom during the reaction, but also the reaction in accordance with the present invention avoids the use of any binding agent such as pyridine to bind further amounts of hydrochloric acid which are formed by the condensation reaction. As indicated above, the hydrogen chloride which is freed by the reaction of the pyridine carboxylic acid chloride with the 4-amino-1-phenyl-2,3-dimethyl-pyrazolone becomes bound to the product formed by the condensation reaction to form the hydrogen chloride thereof which is insoluble in the utilized solvent such as benzene or toluene. However the hydrogen chloride is soluble in water so that an automatic separation of the compound in addition to a purification thereof is possible by proceeding in this manner.

The freed base which is formed by the decomposition of the hydrogen chloride addition product by means of a base such as sodium hydroxide is insoluble in water and precipitates from the aqueous solution. As a matter of fact the neutralization with the base results in the quantitative precipitation of the final compound from the aqueous solution and the compound can be separated by suction filtration or by centrifugation. The filtered or centrifuged wet crude product can be purified by a single recrystallization by means of methanol diluted with water, and in the case of the reaction of nicotinic acid chloride to the final product having the extraordinary higher melting point of 256–257° C. This final product is in such pure forms by means of the single purification operation that further purification operations are unnecessary. The yield is extremely high, generally lying between 85–95% of the theoretical. Contrary thereto the reaction utilizing the normal starting materials which is carried out in the presence of pyridine and under cooling by means of ice only results in a product having a melting point of 250° C. and the yield is at most only 70–80% of the theoretical.

The following examples are given to further illustrate the present invention. The scope of the invention is not, however, meant to be limited to the specific details of the examples.

Example 1

1450 kg. of dry sodium nicotinate are mixed with 3.5 liters of dry benzene and 1260 kg. of thionyl chloride diluted with 1 liter of pure benzene is added to this mixture. The mixture is slowly heated to 80° C. under vigorous stirring which results in a vigorous development of sulfur dioxide. The chlorination is completed in about 3 hours. The main portion of the $SO_2$ escapes in the first ⅓ of this time, the rest is removed by a short period of evaporation after the completion of the reaction. The mixture which remains in the reaction vessel is advantageously cooled only to about 30–35° C.

In a second vessel 2 kg. of 4-amino-1-phenyl-2,3-dimethyl-pyrazolone is dissolved in 8 liters of hot benzene. The solution is slowly poured into the nicotinic acid chloride suspension during a time period of about 30–40 minutes, under vigorous agitation by means of a rapidly rotating stirrer in order to maintain the reaction mixture in homogeneous condition. This is necessary since the condensation product has a tendency to ball together. The temperature increases during the reaction to about 60–70° C. The reaction mixture is not cooled. For further reaction the temperature is maintained constant under further stirring for about 40–50 minutes.

The substance resulting from the condensation (a mixture of the hydrochloride of 4-(pyridine-3-carboxylic acid amido)-2,3-dimethyl-1-phenyl-5-pyrazolone and sodium chloride) is separated from the benzene which can be again utilized. This product of the condensation is then dissolved in water or in aqueous mother liquor from a preceding operation. The aqueous solution of the sodium chloride and of the hydrochloride of the desired final compound is treated with some activated carbon under slight heating. After filtration and cooling the reaction mixture is neutralized with 20% sodium hydroxide whereby the desired compound is precipitated. The yield is 2770 kg. which is equal to approximately 90% of the theoretical. The sodium chloride remains in the solution.

The wet, crude reaction product is recrystallized from five times the amount of aqueous 50% methanol. A further addition of activated carbon is not necessary since the melting point of the final crystallized product can no longer be improved.

The pure product which is obtained from the recrystallization is of uniform structure and has a light yellow color. It has a melting point of 256–257° C.

It is possible in an analogous manner to produce other condensation products of 4-amino- or 4-monoalkylamino-1-phenyl-2,3-dimethyl-pyrazolone with pyridine-mono-carboxylic acid halogenides or pyridine-di-carboxylic acid halogenides. Utilizing for example the same amounts and the same reaction conditions as in the above example there is obtained from the reaction of pyridine-4-carboxylic acid chloride the 4-(pyridine-4'-carboxylic acid amido)-2,3-dimethyl-1-phenyl-5-pyrazolone in a yield of 2515 kg. which is equal to 83% of the theoretical. The melting point of this compound under decomposition is 272° C.

Example 2

1450 kg. of dry sodium nicotinate are mixed with 4 liters of dry benzene and to this mixture is added a mixture of 1260 kg. of thionyl chloride diluted with 1 liter of pure benzene. The mixture is thoroughly stirred while slowly heating to 80° C., resulting in a vigorous development of $SO_2$. The chlorination is completed in about 3 hours. The main portion of the $SO_2$ escapes during the first ⅓ of this time; the rest is quickly removed by evaporation after the completion of the reaction. The mixture remaining in the reaction vessel is advantageously cooled to a temperature of about 30–35° C.

In a second vessel 2200 kg. of 4-methylamino-1-phenyl-2,3-dimethyl-pyrazolone are dissolved in 8 liters of benzene under moderate warming. The solution is poured into the nicotinic acid chloride during a time period of about 30–40 minutes while vigorously stirring by means of a rapidly rotating stirrer in order to prevent balling together of the condensation product. The temperature is increased during the reaction to 60–70° C. No outside cooling is applied. The reaction mixture is stirred for another 40–50 minutes while keeping the temperature constant in order to complete the reaction.

The substance resulting from the condensation, which is a mixture of the hydrochloride of 4-(pyridine-3-carboxylic acid methyl amido)-2,3-dimethyl-1-phenyl-5-pyrazolone and sodium chloride, is separated from the benzene which can be again used. This solid product is taken up in 2.5 liters of methanol saturated with ammonia. This results in the formation of the free base which in a short time precipitates in solid form from the mixture with sodium chloride and ammonium chloride (the hydrochloride is soluble in methanol). The mixture of the base with the sodium and the ammonium chloride is filtered off by suction and for the purpose of separating the base from this sodium chloride and ammonium chloride is treated with methyl ethyl ketone. Sodium chloride and ammonium chloride are insoluble in methyl ethyl ketone.

The first crystallization of the base from the methyl ethyl ketone results in a product having a melting point of 180–183° C. For the purposes of further purification the product is recrystallized two times from methyl ethyl ketone. The now resulting pure product has a melting point of 182–183° C. The compound is in the form of a whitish, yellow, microcrystalline powder. The yield amounts to 75% of the theoretical.

Example 3

2100 kg. of dry sodium salt of quinolinic acid is mixed with 9 liters of dry benzene and to this mixture is added 1260 kg. of thionyl chloride dilute with 1 liter of pure benzene. The mixture is slowly heated to 80° C. under vigorous stirring, resulting in a vigorous development of $SO_2$. The formation of the anhydride is completed in about 3 hours. The main portion of the $SO_2$ already escapes in the first ⅓ of this time. The rest of the $SO_2$ is removed quickly by evaporation after completion of the reaction. The mixture remaining in the reaction vessel is advantageously only cooled to about 30–35° C.

2050 kg. of 4-amino-1-phenyl-2,3-dimethyl-pyrazolone are dissolved in 10 liters of benzene in a second vessel. The solution is slowly added during a time period of 30–40 minutes to the quinolic acid anhydride suspension while vigorously stirring by means of a rapidly rotating stirrer. The vigorous stirring is necessary to keep the reaction mixture homogeneous since the condensation product has a tendency to ball together. The temperature increases during the reaction to about 60–70° C. Outside cooling is not applied. The reaction is completed by additional stirring for 40–50 minutes while maintaining the temperature constant.

The mixture of substances resulting from the condensation is separated from the benzene. The benzene can be utilized again. The separated mixture of substances is mixed with water resulting in the dissolution of the sodium chloirde. Subsequently the reaction mixture is mixed with some sulfuric acid for the purpose of splitting off more or less adhering side products from the condensation product which is the desired compound and also from excess 4-amino-1-phenyl-2,3-dimethyl-pyrazolone. The thereby resulting further precipitation increases the yield.

The separated compound is recovered by suction filtration and washed with a small amount of cold water. The compound is poorly soluble in water. It is then recrystalized from 3 times the amount of 80% methanol. The resulting compound is quinolinic acid-2-(4)-amino-1-phenyl-2,3-dimethyl-pyrazolone or 4-(pyridine-2-carboxylic acid-3-carboxylic acid amido)-2,3-dimethyl-1-phenyl-5-pyrazolone. The yield is about 74% of the theoretical and the product is pinkish white and finely crystalline. The melting point is 150° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a 4-(pyridine carboxylic acid amido)-2,3-dimethyl-1-phenyl-5-pyrazolone, comprising the steps of reacting a metal salt of an unsubstituted pyridine carboxylic acid with substantially the equivalent amount of a thionyl halogenide so as to form the corresponding pyridine carboxylic acid halogenide which is free of hydrogen halide; reacting the thus formed pyridine carboxylic acid halogenide which is free of hydrogen halide with a substance selected from the group consisting of 4-amino-1-phenyl-2,3-dimethyl-pyrazolone and 4-monoalkylamino-1-phenyl-2,3-dimethyl-pyrazolones in the absence of an acid-binding agent so as to form the hydrogen halide of the corresponding compound selected from the group consisting of 4-(pyridine carboxylic acid amido)-2,3-dimethyl-1-phenyl-5-pyrazolones and 4-(pyridine carboxylic acid alkylamido)-2,3-dimethyl-1-phenyl-5-pyrazolones; and recovering the thus formed compound.

2. A method of producing a 4-(pyridine carboxylic acid amido)-2,3-dimethyl-1-phenyl-5-pyrazolone, comprising the steps of reacting an alkali metal salt of an unsubstituted pyridine carboxylic acid with substantially the equivalent amount of thionyl chloride so as to form the corresponding pyridine carboxylic acid chloride which is free of hydrogen chloride; reacting the thus formed pyridine carboxylic acid chloride which is free of hydrogen chloride with a substance selected from the group consisting of 4-amino-1-phenyl-2,3-dimethylpyrazone and 4-monoalkylamino-1-phenyl-2,3-dimethylpyrazolones in the absence of an acid-binding agent so as to form the hydrogen halide of the corresponding compound selected from the group consisting of 4-(pyridine carboxylic acid amido)-2,3-dimethyl-1-phenyl-5-pyrazolones and 4-(pyridine carboxylic acid alkylamido)-2,3-dimethyl-1-phenyl-5-pyrazolones; treating the thus formed hydrogen halide of said compound with a base so as to remove the hydrogen halide from said compound and form the free compound; and recovering the thus formed free compound.

3. A method of producing a 4-(pyridine carboxylic acid amido)-2,3-dimethyl-1-phenyl-5-pyrazolone, comprising the steps of heating an alkali metal salt of an unsubstituted pyridine carboxylic acid with substantially the equivalent amount of thionyl chloride in the presence of a solvent therefor so as to form sulfur dioxide and a reaction mixture including the corresponding pyridine carboxylic acid chloride which is free of hydrogen chloride; driving off the thus formed sulfur dioxide from said reaction mixture so as to obtain said reaction mixture free of hydrogen chloride and of sulfur dioxide; reacting the thus obtained reaction mixture with a substance selected from the group consisting of 4-amino-1-phenyl-2,3-dimethylpyrazolone and 4-monoalkylamino-1-phenyl-2,3-dimethylpyrazolones in the absence of an acid-binding agent so as to form the hydrogen halide of the corresponding compound selected from the group consisting of 4-(pyridine carboxylic acid amido)-2,3-dimethyl-1-phenyl-5-pyrazolones and 4-(pyridine carboxylic acid alkylamido)-2,3-dimethyl-1-phenyl-5-pyrazolones; treating the thus formed hydrogen halide of said compound with a base so as to remove the hydrogen halide from said compound and form the free compound; and recovering the thus formed free compound.

4. A method of producing a 4-(pyridine carboxylic acid amido)-2,3-dimethyl-1-phenyl-5-pyrazolone, comprising the steps of reacting a metal salt of an unsubstituted pyridine carboxylic acid with substantially the equivalent amount of a thionyl halogenide in the presence of an aromatic hydrocarbon so as to form the corresponding pyridine carboxylic acid halogenide which is free of hydrogen halide; reacting the thus formed pyridine carboxylic acid halogenide which is free of hydrogen halide with a substance selected from the group consisting of 4-amino-1-phenyl-2,3-dimethylpyrazolone and 4-monoalkylamino-1-phenyl-2,3-dimethyl-pyrazolones in the presence of an aromatic hydrocarbon and in the absence of an acid binding agent so as to form the hydrogen halide of the corresponding compound selected from the group consisting of 4-(pyridine carboxylic acid amido)-2,3-dimethyl-1-phenyl-5-pyrazolones and 4-(pyridine carboxylic acid alkylamido)-2,3-dimethyl-1-phenyl-5-pyrazolones which is insoluble in said aromatic hydrocarbon; separating said hydrogen halide of said compound from said aromatic hydrocarbon; dissolving the thus separated hydrogen halide of said compound in water; treating the thus formed aqueous solution with a base so as to remove the hydrogen halide from said compound and form the free compound which precipitates; and separating the thus formed precipitate from the remaining aqueous solution, thereby obtaining the free compound.

5. A method of producing a 4-(pyridine carboxylic acid amido)-2,3-dimethyl-1-phenyl-5-pyrazolone, comprising the steps of reacting an alkali metal salt of an unsubstituted pyridine carboxylic acid with substantially the equivalent amount of thionyl chloride so as to form the corresponding pyridine carboxylic acid chloride which is free of hydrogen chloride; reacting the thus formed pyridine carboxylic acid chloride which is free of hydrogen chloride with a substance selected from the group consisting of 4-amino-1-phenyl-2,3-dimethylpyrazolone and 4-monoalkylamino-1-phenyl-2,3-dimethylpyrazolones at a temperature of 60–70° C. in the absence of an acid-binding agent so as to form the hydrogen halide of the corresponding compound selected from the group consisting of 4-(pyridine carboxylic acid amido)-2,3-dimethyl-1-phenyl-5-pyrazolones and 4-(pyridine carboxylic acid alkylamido)-2,3-dimethyl-1-phenyl-5-pyrazolones; and recovering the thus formed compound.

References Cited in the file of this patent

UNITED STATES PATENTS

| | | |
|---|---|---|
| 2,057,145 | Haffner et al. | Oct. 13, 1936 |
| 2,073,100 | Eisleb | Mar. 9, 1937 |

FOREIGN PATENTS

| | | |
|---|---|---|
| 897,407 | Germany | Nov. 19, 1953 |

OTHER REFERENCES

Machek: Monatshefte für Chemie, vol. 72, pp. 80, 81, 91 and 92 (1939).